United States Patent Office 2,927,445
Patented Mar. 8, 1960

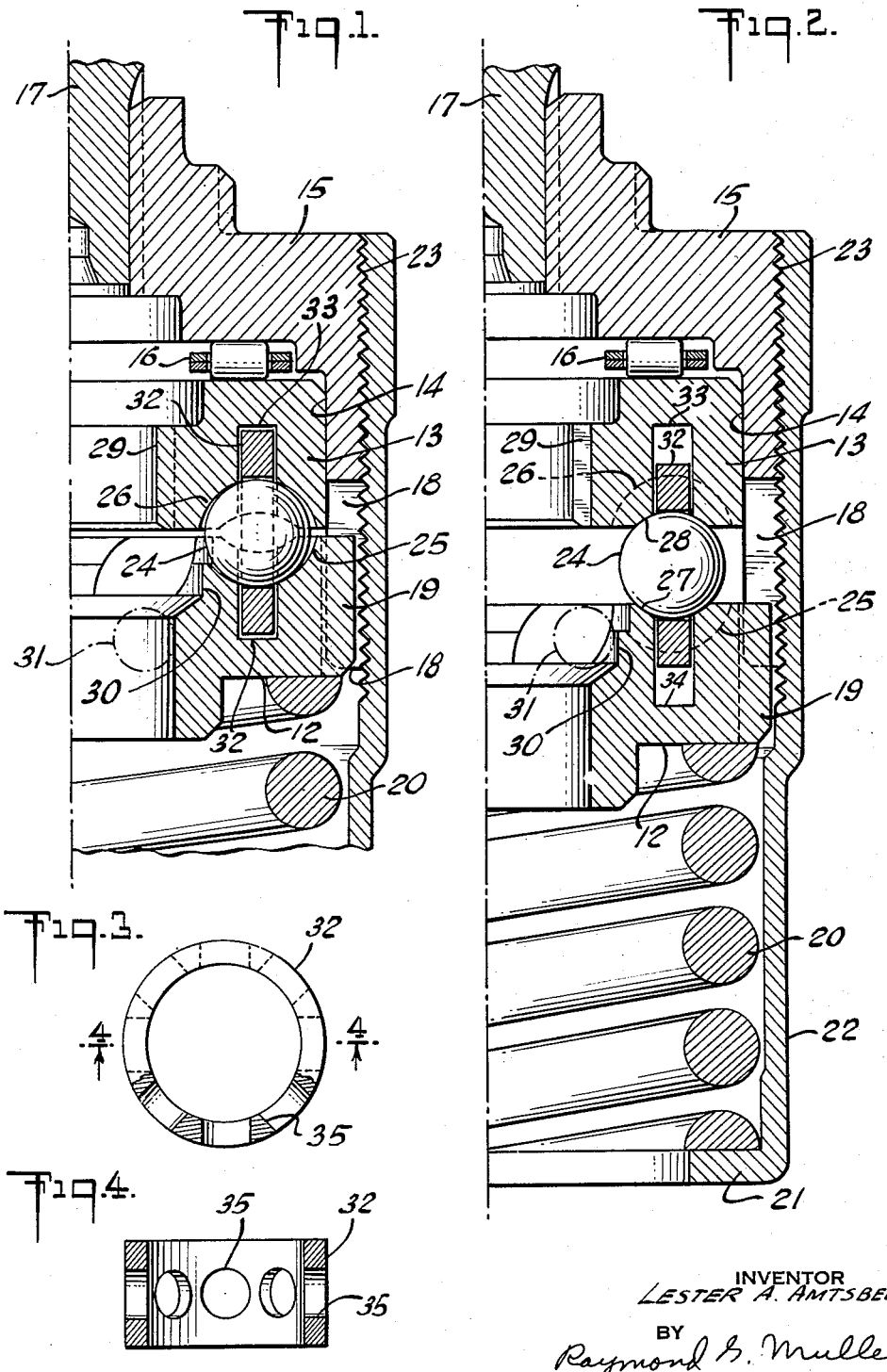

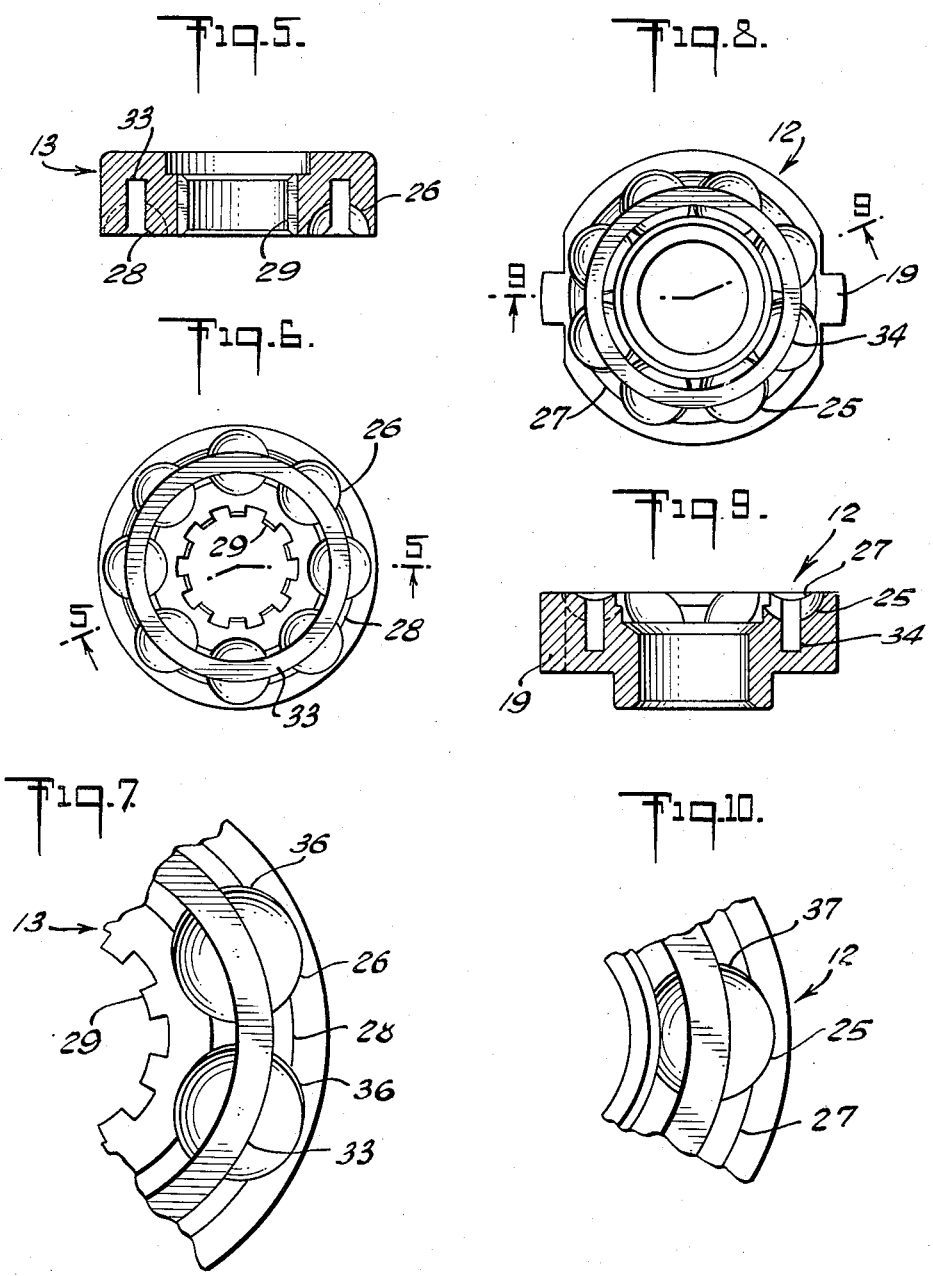

2,927,445

CAM CLUTCH WITH BALL RETAINING AND GUIDING MEANS

Lester A. Amtsberg, Utica, N.Y., assignor to Chicago Pneumatic Tool Company, New York, N.Y., a corporation of New Jersey Application October 20, 1958, Serial No. 768,096

11 Claims. (Cl. 64—29)

This invention relates to cam clutches of the type which release automatically due to the camming action of a set of balls normally seated in pockets in the driving and driven plates, said balls being arranged, on development of a predetermined torque, to climb out of the pockets and hold the clutch plates temporarily separated while the balls are overrunning from one set of pockets to the next. The invention is concerned particularly with the means for maintaining the balls in uniformly spaced relation during the overrun period in order to assure that all balls will re-register at the same time with the succeeding pairs of pockets, and thereby permit the clutch plates to reengage.

This case is a continuation-in-part of applicant's prior application Serial Number 600,876, filed July 30, 1956. As disclosed in that application, the ball cam clutch forms part of a machine for driving screws, nuts or bolts to a predetermined tightness and cooperates with a secondary clutch and control mechanism arranged to kick out the secondary clutch and interrupt the rotation of the driven screw in response to the movement of the ball cam clutch, first in the separating and then in the re-engaging direction. It is important that the clutch re-engage quickly and completely following the separation and period of overrun. In some prior devices of this kind, the reengaging action has been unreliable under certain conditions due to the fact that the balls, in rolling over the faces of the driving and driven plates, do not travel exactly the same distance or over the same path, and get out of their uniformly spaced relation with the result that when one ball registers with a pair of pockets, another ball is out of registry with its associated pockets and prevents the clutch plates from reengaging. Attempts have been made to hold the balls in proper spaced relation by means of a retainer. The conventional retainer, however, being in the shape of a disc, takes up space between the driving and driven clutch plates, making it necessary to reduce the depth of the pockets.

An object of the present invention is the provision of means for retaining and guiding the balls during their overrunning movement from one set of pockets to the next, so as to insure accurate alignment of all of the balls simultaneously when they re-register with the pockets.

A further object is the provision of a ball retainer which does not require the driving and driven clutch plates to be spaced far apart to make room for the retainer. In accordance with this invention the retainer is in the form of a cylindrical cage adapted to project within cylindrical recesses in the driving and driven plates, said cage permitting the clutch plates to remain in closely spaced relation both inside and outside the cage.

A feature of the invention is a set of radial ports provided in the cylindrical cage, said ports being of sufficient axial length to provide proper support for the balls and being of sufficient diameter that the balls may be readily inserted or removed when the parts are being assembled or disassembled. Due to the fact that the retainer cage in itself does not prevent the balls from moving radially, it has been found necessary to provide supplemental means to keep the balls in their proper orbit. Accordingly, another feature of this invention resides in a set of annular grooves provided in the clutch plates to form raceways for the balls to guide them during movement from one pocket to the next and to prevent them from moving in a radial direction.

Another object is the provision of a ball and pocket cam clutch which is simple in construction, inexpensive to manufacture, and capable of operation over long periods with minimum wear and breakage.

In the accompanying drawings which illustrate one embodiment of this invention:

Fig. 1 is an enlarged longitudinal half section of a ball cam clutch embodying this invention, with the clutch plates together as in idle condition;

Fig. 2 is a view similar to Fig. 1 with the clutch plates momentarily in separated condition;

Fig. 3 is a plan view, partly in section, of the retaining cage for the balls;

Fig. 4 is a longitudinal section of the retainer cage taken on the line 4—4 of Fig. 3;

Fig. 5 is a longitudinal section of the upper or driven plate of the cam clutch taken on the line 5—5 of Fig. 6;

Fig. 6 is a bottom view of the driven plate of the cam clutch;

Fig. 7 is a fragmentary view similar to Fig. 6 but on a larger scale;

Fig. 8 is a plan view of the lower or driving plate of the cam clutch;

Fig. 9 is a cross section of the driving plate taken on line 9—9 of Fig. 8;

Fig. 10 is a fragmentary view similar to Fig. 8 but on a larger scale.

Figs. 1, 2, 7 and 10 are drawn to a scale which is double that of the other figures.

Referring to Figs. 1 and 2, the cam clutch comprises a driving plate 12 and a driven plate 13. The latter is supported in a counterbore 14 in a rotatable driving cup 15. Interposed between the top of the driven clutch plate and the bottom wall of the driving cup is a roller thrust bearing 16. The latter cooperates with resilient means (to be described later) to prevent the driven plate 13 from moving axially relative to the driving cup 15, but to permit relative rotation. The driving cup is keyed to a spindle 17 and rotates continuously therewith. Below the counterbore 14, the driving cup has integral fingers 18 engaging a pair of lugs 19 (Fig. 8) provided on opposite sides of the driving clutch plate. The fingers constrain the driving clutch plate for rotation at the same speed as the driving cup 15 but permit relative axial movement. Such movement is resisted by a heavy spring 20, the upper end of which provides a seat for the driving clutch plate and the lower end of which is seated on an inturned flange 21 (Fig. 2) formed on a spring retainer sleeve 22 which surrounds the spring. The upper portion of the retainer sleeve has a threaded connection 23 with the driving cup 15, whereby the sleeve, on being turned, may adjust the amount of compression of the spring and, therefore, the force with which the driving clutch plate 12 is urged upwardly toward the driven plate 13.

The force of the spring is transmitted from the driving plate 12 through a set of balls 24 to the driven plate 13 and through the roller thrust bearing 16 to the driving cup 15. All balls 24 are of the same size. In the normal or idle condition of the parts as shown in Fig. 1, each ball rests at the bottom of a recess or pocket 25 in the clutch driving plate 12 and in a correspondingly shaped recess or pocket 26 in the clutch driven plate 13. The pockets are all of the same size, and at the same distance from the axis of rotation and are uniformly spaced from each other. Accordingly, when one pair of pockets register, all pairs register. An annular groove 27 connects the pockets in the driving plate 12 and provides a raceway for the balls in rolling from one pocket 25 to the next as shown in Fig. 2. A similar annular groove or raceway 28 is provided in the driven clutch plate 13 to provide a raceway connecting the pockets 26 in the driven plate 13.

The parts of the clutch, here disclosed, rotate in unison in the relation shown in Fig. 1 while the spindle 17 is being driven through a suitable motor and gear reduction (not shown) and while the teeth 29 on the driven clutch plate 13 are connected to a screw, nut or bolt (not shown) which offers only moderate resistance to rotation. All of the torque is transmitted through the driving pockets 25, the balls 24 and the driven pockets 26, and these elements due to their shape act as a cam to set up an axial component of force tending to separate the clutch plates 12 and 13. When the driven screw becomes seated and its resistance to rotation increases to the maximum amount, which is predetermined by the adjustment of the spring retainer sleeve 22, the axial component of force between the clutch plates, being proportional to the rotary component, increases sufficiently to overcome the spring 20 causing the driving clutch plate 12 to move down along the fingers 18, thereby permitting the balls 24 to climb out of the pockets 25 and 26. After leaving the pockets, the balls roll along the raceway 28 of the driven clutch plate 13 while the raceway 27 in the driving plate 12 rolls over the balls. The overrunning action continues, with the parts in the Fig. 2 position, until the driving clutch plate 12 has overrun the balls 24 by an angular distance corresponding to the space between two adjacent pockets, and the balls have overrun the driven plate 13 by a corresponding distance. At the end of the overrun period, each ball registers with a new set of pockets. The driving clutch plate 12 is then restored to its upward position by the action of spring 20, and all of the parts of the clutch, which are illustrated in full lines, resume the position of Fig. 1.

The driving clutch plate 12 is provided with an annular recess 30 adapted to register with and receive a locking detent 31 when the driving plate 12 is lowered to the Fig. 2 position and to raise the detent when the driving plate is restored to the position of Fig. 1.

The structure and mode of operation described up to this point are essentially the same as in applicant's prior application Serial Number 600,876, to which reference may be made for a more detailed description of the complete machine, in which the present invention may be applied. As explained in that application, the locking detent 31 forms part of a device for kicking out a secondary clutch when the detent is raised from the Fig. 2 position, whereby further rotation of the driving spindle 17 causes the clutch plates 12 and 13 to continue to rotate in unison without transmitting any torque to the driven bolt, nut or screw (not shown). The structure and operation of the secondary clutch and the kickout mechanism are not essential to an understanding of the present invention, it being sufficient for present purposes to state that the cam clutch separates from the Fig. 1 to the Fig. 2 position in response to a predetermined torque, remains separated or disengaged for a brief interval of time and then reengages to the Fig. 1 position. The present invention, however, does relate to the length of time that the clutch plates are maintained in the separated condition of Fig. 2.

As shown in Figs. 6 and 7, the driven pockets 26 are not spaced as closely as possible to each other, as they are in some prior art constructions, but are separated by a substantial length of raceway portions 28, thus requiring a finite interval of time during the passage of the ball from one pocket to the next, the time being sufficient to permit the ball detent 31 and associated kickout mechanism (not shown) to become effective. A similar space between the driving pockets 25 is shown in Fig. 8. The substantial circumferential spacing of the pockets creates a new problem when the clutch rotates at high speed, for example, 2,000 revolutions per minute, because the rapidly descending clutch plate 12 sometimes overshoots due to inertia and loses contact between the annular raceways 27 and 28 and the balls 24. When the balls lose contact with the raceways, they sometimes move at slightly different speeds and become un-uniformly spaced. When this happens, it is possible for one ball 24 to register with its associated pockets 25 and 26 while another ball is out of registry with its pair of pockets, thus preventing engagement of the clutch plates.

Attempts have been made to solve this problem by providing a retainer to maintain the balls uniformly spaced, to correspond to the uniform spacing of the pockets. The use of a conventional retainer, while solving one problem, however, creates another because it takes up space, in an axial sense, between the opposed faces of the driving and driven plates 12 and 13. Taking up space for the retainer makes it necessary to shorten the depth of the pocket and reduce the angle at the edge of the pocket. This reduces the maximum torque unless compensated for by the use of a more powerful spring, which in turn would increase the bulk of the machine.

The present invention solves the problem of keeping the balls uniformly spaced in a circumferential sense, without making it necessary to take up space between the opposed faces of the driving and driven clutch plates.

According to the present invention, the retainer element is in the shape of a cylindrical cage or sleeve 32. The upper part of the cage is loosely fitted within a cylindrical recess 33 formed in the upper or driven clutch plate 13. The cage is mounted for rotary and axial, but not radial, movement relative to the walls of the cylindrical recess 33. The upper cylindrical recess extends through the centers of the pockets 26 and of the raceways 28, as shown in Figs. 5, 6 and 7. The lower portion of the cage is loosely fitted within a cylindrical recess 34 formed in the driving clutch plate 12. The shape and arrangement of the cylindrical recess 34 is similar to that of the upper cylindrical recess 33. At its midportion, cage 32 has a plurality of radial bores 35, each of cylindrical shape and having a diameter slightly exceeding that of the balls 24. As shown in Fig. 3, there are eight radial bores 35, spaced 45° apart, but the number may be varied, provided that the radial bores are circumferentially spaced by a uniform angle corresponding to the angle spacing the pockets 25 and 26.

The operation of the retaining and guiding means of this invention is as follows: Upon development of a predetermined torque reaction transmitted through the teeth 29 to the driven cam plate 13, the driving plate 12 moves down from the Fig. 1 to the Fig. 2 position, and the balls 24 move out of the pockets 25, 26 into the raceways 27, 28 as previously described. The contact between the balls and the walls of the retainer bores 35 is sufficiently loose to permit the balls to roll freely. Under ordinary conditions, the balls remain in rolling engagement with the raceways until the driving plate 12 rotates 45° ahead of the balls 24 and the latter rotate 45° ahead of the driven plate 13, making a total of 90° rotation of the driving plate ahead of the driven plate, whereupon the clutch reengages to the position shown in Fig. 1. The continuous engagement between the balls 24 and raceways 27, 28 is ordinarily sufficient to cause all of the balls to roll the same distance over the raceways at the same time and thereby maintain a uniformly spaced circumferential relation so that when one ball registers with the succeeding pair of pockets all the other balls register in the same manner. Under conditions of high speed and high axial inertia of the driving plate 12, however, the clutch plates may be spaced apart momentarily by a greater distance than the amount shown in Fig. 2 and one or more of the balls may lose contact with the raceways 27, 28. However, the retainer cage 32 positively prevents the balls from getting out of the uniform circumferentially spaced relation. The retainer cake is free to float in a vertical or axial direction, its position being determined by that of the balls 24. That is to say, the cage follows the downward movement of the balls from the Fig. 1 to the Fig. 2 position by moving downward a corresponding amount in the cylindrical recess 33. At the same time the lower cylindrical recess in the driving clutch plate 12 moves downward with respect to the retainer. The speed of rotation of the retainer cage is also controlled by the balls, being less than that of the driving plate 12 and greater than that of the driven plate 13 when the parts are in the overrunning condition of Fig. 2. Radial movement of the retainer cage is prevented by the frictional engagement with the walls of the cylindrical recesses 33 and 34. The retainer cage 32 does not in itself include any means to prevent the balls 24 from moving out of their circular orbit. However, movement of the balls toward or away from the axis of rotation of the clutch is prevented by the arcuate grooves 27, 28.

As stated previously, each driving pocket 25, which normally registers with an associated driven plate 26 will, upon displacement and overrun, re-register with the last driven plate following 90° of rotation of the driving plate 12 ahead of the driven plate 13. At the time the pockets re-register, the balls will have been displaced by the same number of degrees, usually 45°, in which case the parts will be restored to the Fig. 1 position. If, however, the balls have rotated slightly more or slightly less than 45° since their last registry, they will engage the sides of the pockets with a camming action to cause a slight relative rotation between the retainer cage 32 and the clutch plates 12 and 13, until the balls register exactly with the pockets.

The retainer cage 32, due to its shape, permits the faces of the driving and driven clutch plates 12 and 13 to be spaced closely to each other as shown in Fig. 1, and therefore permits the effective portion of the pockets 26 to extend for nearly 180° or over a zone approximating a hemisphere. As shown in Figs. 5, 6 and 7, part of the pocket 26 is cut away to provide a cylindrical recess 33 for receiving the retainer cage 32. However, the interruption or discontinuity of the cam surface of the pocket does not materially impair the function of the pocket because the remaining surface is sufficient to provide the necessary cam action. Also a portion of the raceways 27 and 28 is cut away to provide the cylindrical recesses 33 and 34, but the loss of raceway area is not accompanied by any loss of function because the central portion of the raceways is not effective as a guide in keeping the balls within their circular orbit.

If desired, a crescent shaped chamfer 36 may be provided along the edge of the driven pocket 26 and a similar chamfer 37 (Fig. 10) may be provided along the edge of the driving pocket 25, to make the balls 24 disengage more readily from the pockets when they roll over the chamfered edges, than when they are driven in the opposite direction and roll over the edges which are not chamfered. The purpose of the chamfer is to make the clutch release at a slightly lower torque when driven in a direction to tighten the screw than when driven in a loosening direction. With this arrangement it is always possible for the operator to remove a screw after driving it to a predetermined tightness, without the clutch disengaging during the loosening operation and without changing the clutch adjustment to a higher torque value.

The annular grooves or raceways 27 and 28 should have a radius in cross section equal to that of the balls 24 to provide maximum area of contact with the balls and to minimize wear. The pockets 25 and 26 should have a radius equal to or slightly greater than that of the balls. If the radius is the same, the ball contacts the entire hemi-spherical surface of the pocket except where the latter is cut away. With this arrangement of equal radii, the driving action and also the camming action of the pocket occurs over a relatively large area of the ball, and the latter, upon starting to climb out of the pocket, completes the declutching action rather suddenly. If the pocket has a greater radius than the ball, however, the driving and camming force is transmitted to the ball over a relatively small pocket area at any one time. The oversize pocket arrangement introduces lost motion between the plates 12 and 13 while engaged and permits the driving plate 12 to rotate a substantial distance ahead of the driven plate 13 during the interval between the start of the axial separating movement of plate 12 and the completion of such separating movement. During such interval the angle of engagement between the ball and pocket becomes gradually steeper to increase the torque required for further separating movement. With this arrangement, the clutch may continue to run, without disengaging completely, when the driven plate encounters a relatively high torque reaction over a brief interval of time, and responds only to a torque reaction which is sustained throughout the interval necessary to complete the axial separation of the clutch.

As shown in Fig. 1, the increase in the radius of pockets 25 and 26 above that of the balls 24, makes it necessary to reduce the arc of the pockets below 180 degrees and therefore to reduce the cam angle at the edge of the pocket where the ball completes its disengaging movement. The interposition of a conventional disc type retainer between the clutch plates 12 and 13 would make it necessary to reduce the arc and cam angle further with the resulting reduction in the maximum torque delivered under any given spring pressure. The present invention, which does not require the clutch plates 12 and 13 to be widely spaced to make room for the retainer element, permits the pockets to extend over an arc of sufficient size. The retainer sleeve 32 also assures uniform spacing of the balls not only during the overrun period while the balls are in the raceways 27 and 28, but also during the interval between the start of the clutch separating movement and the completion thereof, which interval results from the provision of oversize pockets.

What is claimed is:

1. A torque release clutch comprising a driving plate and a driven plate co-axially rotatable, the adjacent faces of said plates being provided with a plurality of approximately spherical pockets, said pockets being uniformly spaced from each other whereby all of the pockets register simultaneously, balls received in said pockets and serving to transmit torque from the driving plate to the driven plate with a camming component of force, resilient means holding the plates together in driving relation with the balls seated in the pockets but yieldable upon camming action resulting from development of a predetermined torque to permit relative axial separation of the plates, said driving plate being adapted on separation to overrun the driven plate and to re-engage upon re-registry of the pockets, and a retainer cage for maintaining the balls uniformly spaced from each other during the period of overrun, said retainer cage comprising a cylindrical sleeve co-axially rotatable with the driving and driven plates, said sleeve being received within registering cylindrical recesses in the clutch plates and being movable axially and rotatably with respect to the walls of the cylindrical recesses.

2. A torque release clutch according to claim 1, in which the sleeve has a plurality of radial bores, each adapted to receive a ball, said bores being spaced circumferentially by a uniform distance corresponding to the circumferential spacing of the pockets.

3. A torque release clutch comprising a driving plate, a driven plate, a plurality of balls arranged between said plates to establish a releasable driving connection, and retaining means for maintaining the balls in uniformly spaced relation during rotation of the driving plate ahead of the balls and driven plate, said retaining means comprising a cylindrical cage having a plurality of radial ports each arranged to receive an associated ball, said ports being uniformly spaced about the circumference of the cage, one end of the cage being received within a circumferential recess in the driving plate and the other end of the cage being received within a circumferential recess in the driven plate, said cage being supported by the walls of the recess against radial movement but having axial and rotative movement relative to the walls of the cylindrical recesses, such axial and rotative movement being controlled by the position of the balls.

4. A torque release clutch comprising a driving plate and a driven plate co-axially rotatable, the adjacent faces of said plates being provided with a plurality of approximately spherical pockets, said pockets being spaced from each other by a uniform circumferential distance and being disposed at the same radial distance from the axis of rotation whereby all of the pockets register simultaneously, balls received in said pockets and serving to transmit torque from the driving plate to the driven plate with a camming component of force, resilient means holding the plates together in driving relation with the balls seated in the pockets but yieldable upon camming action resulting from development of a predetermined torque to permit relative axial separation of the plates, said driving plate being adapted on separation to overrun the driven plate and to re-engage upon re-registry of the pockets, and a plurality of means of maintaining the balls uniformly spaced from each other during the period of overrun, one of said means comprising a retainer element holding the balls against movement in a circumferential direction relative to each other and the other of said means comprising a guide for confining the balls to a fixed orbital path and for preventing movement of the balls in a radial direction relative to the axis of rotation, said last named means including an annular groove provided on the face of one or both of the clutch plates and connecting the pockets, said annular groove providing a raceway for the balls during the overrunning action.

5. A torque release clutch according to claim 4, in which each clutch plate is provided with a cylindrical recess connecting the pockets near the centers thereof, and in which the retainer element comprises a cylindrical cage slidably fitted in said circumferential recesses, said cage being supported partly by the balls and partly by the walls of the circumferential recesses.

6. A torque release clutch according to claim 5, in which the annular grooves or raceways connecting the pockets are formed along the edges of the cylindrical recess.

7. A torque release clutch according to claim 4, in which the annular groove is arcuate in cross section and has the same radius as the balls to provide a large area of contact between the clutch plate and balls.

8. A torque release clutch according to claim 7, in which each pocket has a radius exceeding that of the ball and of the annular groove or raceway connecting the pockets.

9. A torque release clutch according to claim 7, in which a chamfer is provided on one edge of each pocket adjacent the annular groove or raceway, whereby the clutch releases at a lower torque in one direction than in the other direction.

10. A torque release clutch comprising a driving clutch plate, a driven clutch plate above the driving plate, a driving cup above the driven plate, means including longitudinal fingers extending between the driving cup and driving clutch plate to impart rotation from the cup to the driving plate while permitting relative axial movement, spring means urging the driving plate and driving cup toward each other, the lower face of the driven plate and the upper face of the driving plate being provided with a plurality of uniformly spaced pockets, balls received within said pockets and serving to transmit torque from the driving plate to the driven plate with a camming component of force tending to overcome said spring means to separate the clutch plates, said driving plate being adapted on separation to overrun the driven plate and to re-engage upon re-registry of the balls with the pockets, anti-friction means located on top of the driven plate and ball raceways connecting the pockets of both the driving and driven plates and engageable with the balls during the period of overrun, said spring holding the driven clutch plate against axial movement relative to the cup and in rolling contact with both the anti-friction means and the balls during the period of overrun.

11. A torque release clutch according to claim 10 which includes a retainer cage supported by the balls and arranged to maintain the balls in uniformly spaced relation.

References Cited in the file of this patent

UNITED STATES PATENTS

| | | |
|---|---|---|
| 2,382,975 | Coddington | Aug. 21, 1945 |
| 2,490,172 | Swahnberg | Dec. 6, 1949 |
| 2,750,020 | Rice et al. | June 12, 1956 |
| 2,802,354 | Bohnhoff et al. | Aug. 13, 1957 |

FOREIGN PATENTS

| | | |
|---|---|---|
| 1,113,209 | France | Nov. 28, 1955 |